May 16, 1944.　　　R. WALKER ET AL　　　2,348,767
GAS FIRED APPARATUS
Filed Dec. 18, 1939　　　2 Sheets-Sheet 1

Inventors
John J. Wolfersperger
Raymond Walker
by John D. Rippey
Their Attorney

May 16, 1944.    R. WALKER ET AL    2,348,767
GAS FIRED APPARATUS
Filed Dec. 18, 1939    2 Sheets-Sheet 2
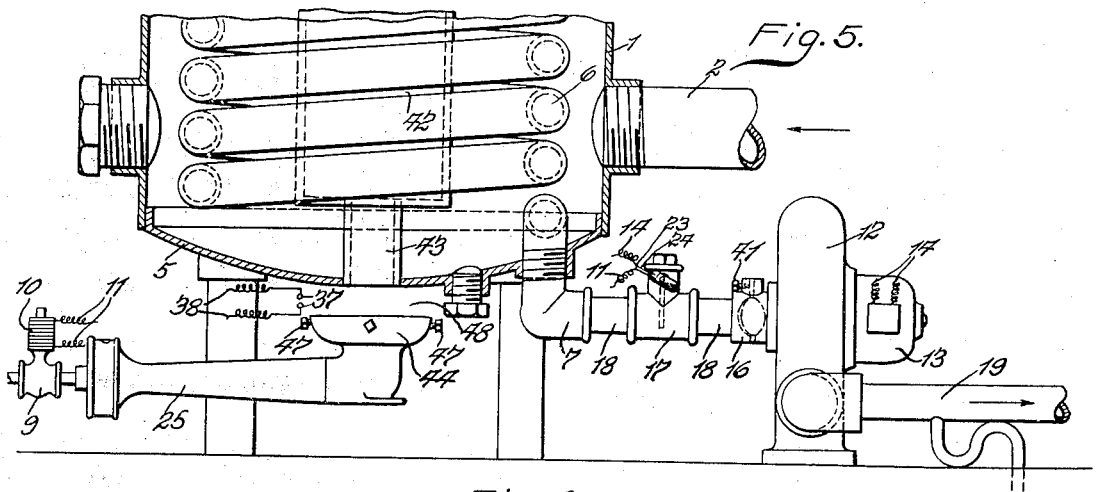
Fig. 5.
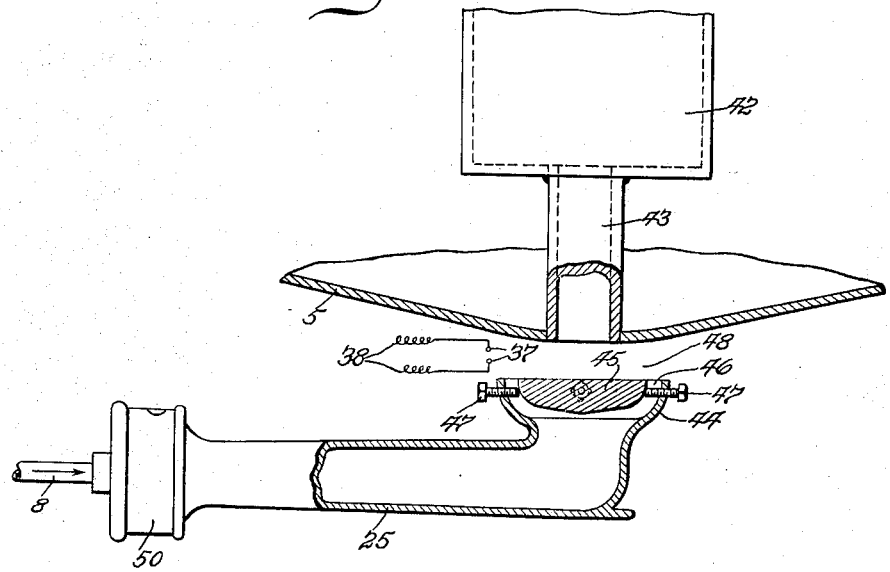
Fig. 6.
Fig. 8.
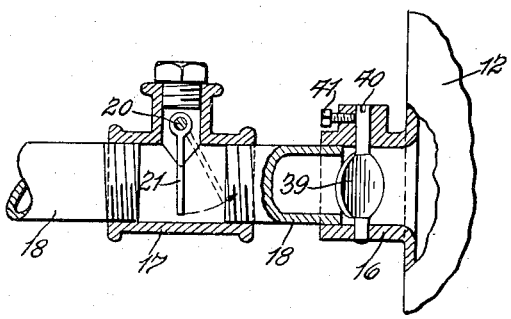
Fig. 7.
Inventors
John J. Wolfersperger
Raymond Walker
by John D. Rippey
Their Attorney Patented May 16, 1944

2,348,767

UNITED STATES PATENT OFFICE 2,348,767

GAS FIRED APPARATUS

Raymond Walker, St. Louis, and John J. Wolfersperger, Webster Groves, Mo.

Application December 18, 1939, Serial No. 309,754

2 Claims. (Cl. 158—7)

This invention relates to a gas fired boiler.

An object of the invention is to provide an improved gas fired boiler having a tank containing the water, in combination with a device supported below the tank for effecting and maintaining initial and incomplete combustion of a mixture of a controlled supply of gas and primary air, and means within the tank and cooperatively associated with said device for increasing to high velocity the flow of the partially ignited mixture passing from said device and producing and maintaining a high turbulence and thorough mixing of the gas with a controlled quantity of additional or secondary air that becomes entrained with the partially ignited gas to cause immediate complete and perfect combustion of the mixture within said means and mechanism connected with said means for withdrawing from within the tank the burnt gases and for regulating suction draft to said combustion device and means.

Another object of the invention is to provide an improved burner or combustion device for use in association with a gas fired boiler and including a burner having a discharge outlet of relatively large area at which the gas and primary air is initially and partially ignited, in combination with a combustion tube within the boiler tank above said burner and having a passage of considerably less area than the area of the discharge outlet, and mechanism for inducing a flow of the initially and partially ignited gas and primary air into and through said reduced passage under conditions of high velocity and high turbulence to effect thorough mixing of the unburnt gases with the secondary air and cause complete combustion, and means for utilizing the heat created by the complete combustion of the gas to heat the water within the tank.

Another object of the invention is to provide an improved combustion device for use in association with a gas fired boiler and including a pipe for conducting gas to said device and having a valve for controlling the flow of gas therethrough, in combination with mechanism for inducing a flow of the initially and partially ignited gas and the burnt gases, and means operated by said flow for opening and closing said valve to control the flow of gas through said pipe to said device.

Various other objects and advantages of the invention will be apparent from the following description, reference being made to the annexed drawings, in which—

Fig. 5 is a side elevation showing a modified form of the burner device.

Fig. 6 is an enlarged vertical sectional view of the burner device shown in Fig. 5.

Fig. 7 is a sectional view showing the device for regulating the induced flow of the initially and partly ignited gas into and through the reduced passage opening into the combustion chamber, and also showing a part of the device controlling the opening and closing of the gas supply valve.

Fig. 8 is a diagrammatic view of the switch device controlling the gas supply valve.

This application is a continuation in part of our application Serial No. 60,958, filed January 27, 1936, for Gas fired boiler.

Figure 1:
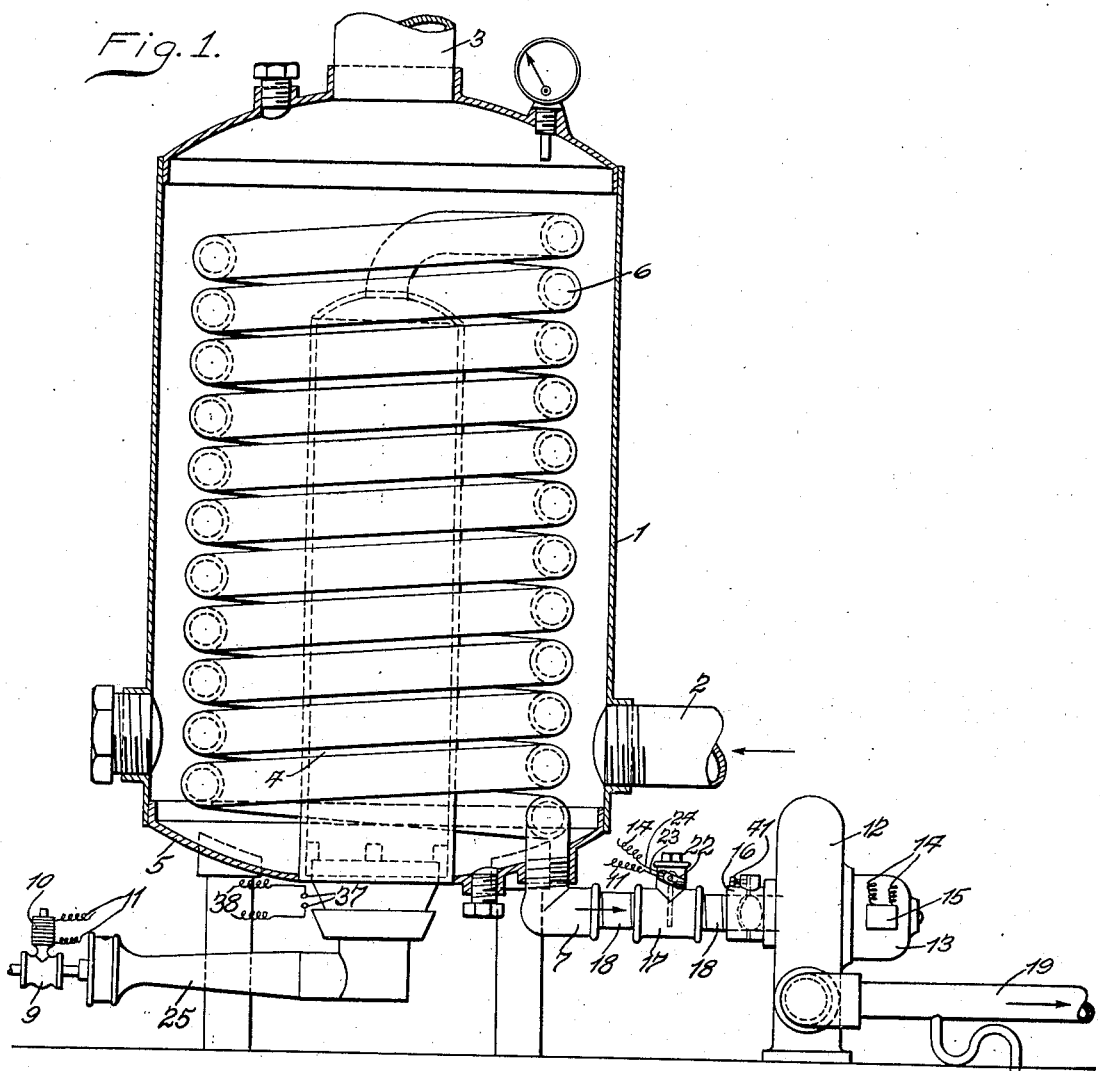
Fig. 1 is a side elevation of the invention in association with a boiler having the water tank shown in section.

As shown in Fig. 1, the invention is embodied in a gas fired boiler having a water tank 1 connected with the usual water supply pipe 2, and with a service pipe 3. A combustion chamber 4 is attached to the bottom wall 5 of the water tank and at its upper end opens into a coil 6 the lower end of which opens into a fitting 7 extending to the outside of the tank.

A gas supply pipe 8 is equipped with a valve 9 operated electrically or magnetically by a device 10 by electrical energy supplied through the circuit wires 11. The valve 9 is always closed when the circuit to the valve actuator device 10 through the wires 11 is open.

An exhaust fan or mechanism 12 is operated by an electric motor 13 energized through circuit wires 14 controlled by a switch device 15. The switch device 15 may be of any suitable type and operated in any familiar manner, as for instance, by a remotely located thermostat or its equivalent (not shown), to start the motor 13 when the temperature at the thermostat becomes lower than desired and to stop the motor when the temperature at the thermostat is raised to the desired degree. Such motor control devices are familiar, constitute no specific part of the present invention, and are well understood without detailed illustration herein. The mechanism 12 is connected through fittings 16 and 17 and pipe connections 18 with the fitting 7. When the mechanism 12 is operated, it creates an induced flow of air into and through the combustion chamber 4 and thence through the coil 6, fitting 7, and other connections to said mechanism 12, which exhausts through a pipe 19.

A pivot 20 is mounted in the fitting 17 and supports an actuator or vane 21 within said fitting and arranged to be operated by a flow of air or gas through said fitting toward the mechanism 12. A mercury switch device 22 is attached to the pivot 20 and is equipped with two terminals 23 and 24 of which the terminal 23 is connected to one of the wires 11 and the terminal 24 is connected to one of the wires 14. In the off position of the vane 21, the two terminals 23 and 24 are out of electrical communication and the switch is open; and, when an induced flow is caused by the mechanism 12, the vane 21 will be moved to the dotted line or on position shown in Fig. 7, the terminals 23 and 24 placed in electrical communication to close the switch, the device 10 electrically energized, and the valve 9 thereby opened. When the valve 9 is opened in this manner, gas passes from the pipe 8 into the primary mixing tube 25 to the burner, which is located in a definite relationship near the open lower end of the combustion chamber 4.

The mixture of primary air and gas passes from the primary mixing tube 25 through an outlet 26 into an enlarged burner head comprising a bottom wall 27 and an upwardly flaring side wall 28. This part of the burner head is separated from the lower end of the combustion chamber 4 by a space 29 which permits a controlled quantity of additional or secondary air to become entrained with the partly ignited mixture at the open end of the burner head part already described. The burner head further includes a device that functions to spread and control the gas passing the space 29 into the combustion chamber 4, and to cause great increase in the velocity of the partially ignited mixture passing into the combustion chamber. Said device includes a bottom wall 30, an upwardly flaring side wall 31, and a relatively short cylindrical portion 32 rising from the upper end of the side wall 31 within and concentric with the combustion chamber 4 and having spacer fingers 33 integral therewith for holding said device uniformly separated from the combustion chamber by an annular space 34. Ribs 35 support this device within the cup-shaped member 27, 28 of the burner head and separated therefrom by an annular space 36, the area of which is relatively much greater than the area of the space 34 formed within the lower end of the combustion chamber. An igniter comprising a spark gap device 37 is located within the space 29 between the passages 34 and 36 in position to cause immediate ignition of gas passing from or through the burner head. The ignition device is in a controllable electrical circuit 38.

A valve or damper 39 (Fig. 7) is mounted beyond the fitting 17 and its equipment and within the fitting 16. The valve 39 is provided with means 40 whereby it may be turned to selected adjusted positions to regulate and control the induced draft caused or produced by the mechanism 12. A set screw 41 is engageable with the part 40 to hold the said valve securely in any selected adjustment, and is releasable to permit the valve to be turned to different adjusted positions.

From the foregoing, it is apparent that, when the switch 15 is closed, the motor 13 is energized and the mechanism 12 operated thereby to induce a flow through the passage 34 into the combustion chamber 4 and thence through the coil 6 to ultimate discharge through the pipe 19. This induced flow moves the part 21 toward the dotted line position (Fig. 7) and closes the circuit to the valve actuator 10. The valve 9 is thereby opened and gas from the pipe 8 passes to the burner head and is ignited by the spark gap device 37 within the space 29. The partially ignited gas becomes entrained with an additional or secondary quantity of air within the space 29 and is drawn through the space 34 into the combustion chamber where complete and perfect combustion immediately takes place. The burnt gases and products of this perfect combustion are withdrawn by the mechanism 12 through the coil 6 and discharged through the pipe 19. So long as the induced flow is maintained by the mechanism 12, the mercury switch device remains closed and the valve 9 is held open by the electrically energized device 10. When the induced flow is stopped by stopping of the mechanism 12, the part 21 is actuated to vertical position by gravity or otherwise if desired, and thereby moves the mercury switch to open the circuit between the contacts 23 and 24, thereby deenergizing the device 10 and leaving the valve 9 free to close.

The modification shown in Figs. 5 and 6 extends only to the combustion chamber 4 and to the burner head and the relationship of each to the other. The remaining parts are the same as the parts already described and have like reference numerals applied thereto.

In this modification, the combustion chamber 42 is enclosed completely within the water tank 1 and has a tube 43 of greatly reduced cross-sectional area forming a passage from the bottom of said combustion chamber through the bottom 5 of the water tank. This tube 43 is analogous to the passage 34 and serves as a conduit for the partially ignited mixture of primary air and gas together with the entrained secondary air into the combustion chamber 42. The burner head at the end of the primary mixing tube 25 comprises an enlarged flaring portion 44 of relatively much greater diameter than the diameter of the tube 43. A spreader 45 is mounted concentrically within the part 44 and provides an annular discharge passage 46 the area of which is considerably greater than the cross-sectional area of the tube 43. The spreader 45 is adjustably supported within the part 44 of the burner head by screws 47 by manipulation and adjustment of which said spreader 45 may be supported in proper position in which its upper surface is even with the upper edge of the part 44. This burner head is separated from the bottom 5 of the water tank and from the lower end of the tube 43 by a space 48 for the admission of an additional or secondary quantity of air that becomes entrained with the partially ignited mixture of gas and primary air passing from the burner head toward and into the tube 43 and thence into the combustion chamber 42. The mechanism 12 for causing and maintaining an induced flow into and through the combustion chamber produces and maintains a high turbulence and a thorough mixture of the primary air and gas with the additional quantity of secondary air that becomes entrained therewith in the space 48. The result is that complete and perfect combustion is caused within the combustion chamber 42, and said combustion chamber and the coils 6 are thereby heated to the maximum degree attainable by such perfect combustion.

Figure 2:
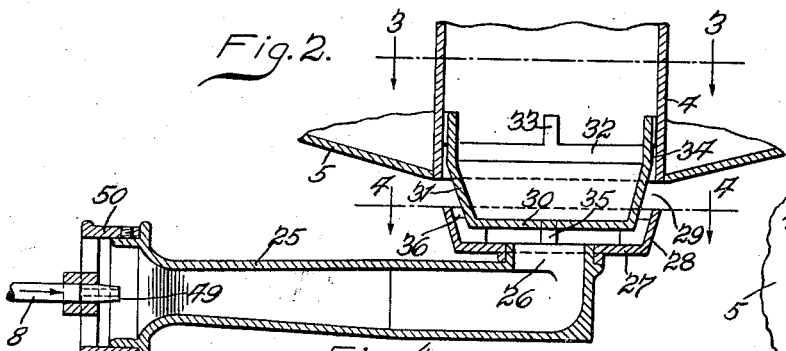
Fig. 2 is an enlarged sectional view of the burner device showing the relationship of the elements thereof to provide a gas discharge outlet of relatively large area formed adjacent to an inlet passage of relatively reduced area and opening into the combustion chamber that is within the water tank.
Figure 3:
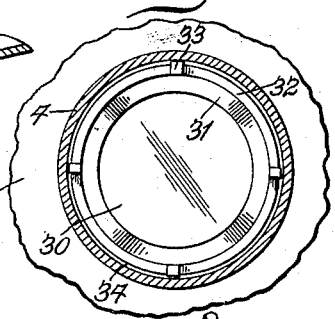
Fig. 3 is a cross-sectional view of the combustion chamber on the line 3—3 of Fig. 2.
Figure 4:
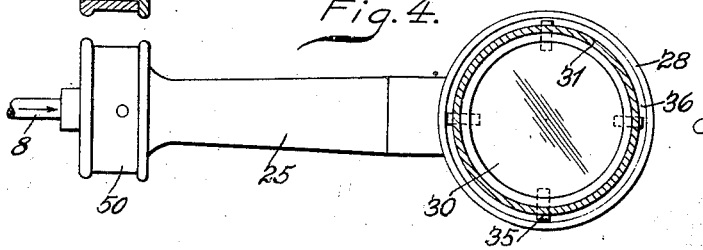
Fig. 4 is a cross-sectional view on the line 4—4 of Fig. 2.

In both specific forms of the invention shown, the gas supply pipe 8 is equipped with a burner tip or orifice 49 (Fig. 2). The said burner tip or orifice controls the quantity of gas and opens into the mixing tube 25 through a mixing face 50, which admits primary air for mixture with the gas. The gas passing from the tip or orifice 49 under system pressure directs a stream of gas of small diameter and high velocity into the mixing tube and induces and controls the quantity of a flow of primary air from atmosphere through the mixing face 50 and into the gas stream in the mixing tube. The velocity of the gas stream carries this mixture of gas and primary air through the mixing tube into the burner head.

It should now be apparent that this invention may be varied as to form otherwise than as specifically shown, and that it attains all of its intended objects and purposes with a high degree of satisfaction and efficiency. A specific relationship of the parts to provide for the mixture of a controlled quantity of secondary air with the partially ignited mixture of primary air and gas in controlled quantities is one highly important feature of the invention, and the devices controlled by the induced flow for regulating operation of the burner are deemed essential. These may be varied without departure from the nature and principle of the invention so long as equally beneficial results are obtained.

We claim:

1. A device of the character described comprising a wall forming a combustion chamber of relatively large diameter and having one end opening to atmosphere, an element located within said end of said chamber and forming a restricted inlet about said element and within said chamber, a burner head supported adjacent to said chamber and having a discharge outlet for a primary mixture of air and gas separated from said inlet by a space for admitting secondary air into said mixture, an ignition device approximately at said space for initially and partially igniting the primary mixture discharged from said outlet before said mixture enters said inlet, and mechanism for maintaining an induced flow from said space through said inlet and effecting a mixture of additional or secondary air with the partially ignited primary mixture of air and gas and causing more complete combustion of the final mixture within said chamber.

2. A device of the character described comprising a wall forming a combustion chamber of relatively large diameter and having one end opening to atmosphere, a tube of relatively small diameter opening from the opposite end of said combustion chamber, an element located within said first end of said chamber and forming a restricted inlet about said element and within said chamber, a burner head supported adjacent to said chamber and having a discharge outlet for a primary mixture of air and gas and separated from said inlet by a space admitting secondary air into said mixture, an ignition device approximately at said space for initially and partially igniting said primary mixture discharged from said outlet before said mixture enters said inlet, and mechanism connected with said tube for increasing to high velocity the flow of the partially ignited primary mixture of air and gas and effecting a mixture of additional or secondary air therewith and causing more complete combustion of the final mixture within said chamber.

RAYMOND WALKER.
JOHN J. WOLFERSPERGER.